United States Patent [19]

Massey

[11] Patent Number: 4,914,279
[45] Date of Patent: Apr. 3, 1990

[54] CARD READING APPARATUS HAVING A PASSIVE ELECTRICAL SPEED CONTROLLER

[75] Inventor: James C. R. Massey, Glasgow, Scotland

[73] Assignee: Unisys Corporation, Blue Bell, Pa.

[21] Appl. No.: 300,689

[22] Filed: Jan. 19, 1989

Related U.S. Application Data

[62] Division of Ser. No. 868,755, May 30, 1986, abandoned.

[30] Foreign Application Priority Data

Dec. 5, 1985 [GB] United Kingdom ............... 8530002

[51] Int. Cl.$^4$ .................. G06K 13/08; G06K 13/077
[52] U.S. Cl. ............................... 235/449; 235/475; 235/476; 235/482
[58] Field of Search ............... 235/482, 449, 436, 454, 235/475, 476, 477, 479, 480; 360/2

[56] References Cited

U.S. PATENT DOCUMENTS

| | | | |
|---|---|---|---|
| 3,885,132 | 5/1975 | Luoma | 235/480 |
| 3,896,293 | 7/1975 | Pass | 235/480 |
| 3,976,858 | 8/1976 | Haun | 235/482 |
| 4,288,825 | 9/1981 | Hasuo et al. | 235/475 |
| 4,380,734 | 4/1983 | Allerton | 235/449 |
| 4,390,905 | 6/1983 | Tokitsu | 235/482 |
| 4,423,320 | 12/1983 | McPherson | 235/482 |
| 4,703,186 | 10/1987 | Nakayama et al. | 235/472 |

Primary Examiner—Vincent P. Canney
Assistant Examiner—Robert A. Weinhardt
Attorney, Agent, or Firm—Mark T. Starr

[57] ABSTRACT

Disclosed is an apparatus for reading information stored on a card. The card is introduced through a slot in the fascia and moved along an adjacent guide path by the user. A slider, coupled to the guide path, interrupts the leading edge of the card as the card is moved into the slot and along the guide path. One or more springs, coupled between the slider and a fixed position, store elastic energy as the card is moved into the apparatus and along the guide path. Upon the user releasing the card, the stored elastic energy is applied to the slider to move the card back along the guide path and expel the card through the slot. A speed controlled comprised of a passive D.C. generator/diode under configuration, coupled between the slider and the guide path, maintains the velocity of the card constant as the card moves in either or both directions along the guide path, thereby allowing a fixed position optical or magnetic transducer to read the stored information from the card.

16 Claims, 5 Drawing Sheets

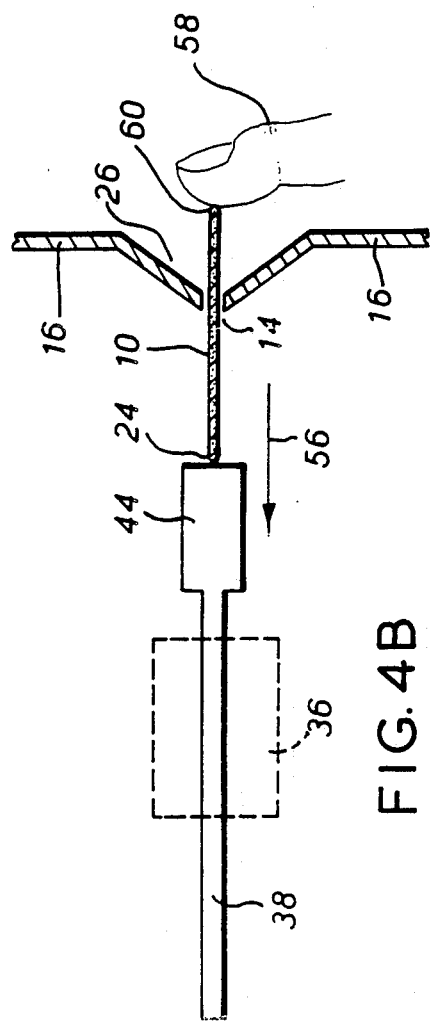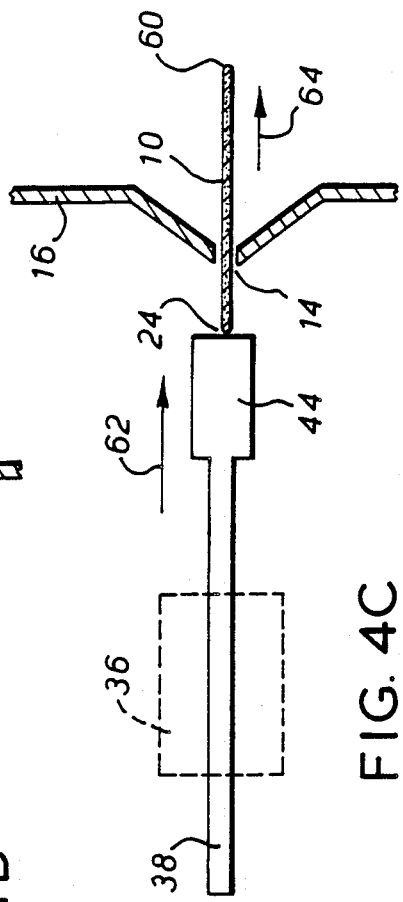

CARD READING APPARATUS HAVING A PASSIVE ELECTRICAL SPEED CONTROLLER

This is a divisional of co-pending application Ser. No. 868,755 filed on May 30, 1986 which has been abandoned.

BACKGROUND OF THE INVENTION

The present invention relates to an apparatus for reading information on cards inserted into equipment to allow access to or use of that equipment.

It is known to use card readers in bank autotelling equipment, security, access systems, and in equipment where only authorized users should gain access, for information recorded on a card to be read. The recovered information can then be used to control access to or use of the equipment or facility.

Card readers known in the art are relatively complex devices employing motor-driven paths along which a card, introduced through the slot, is conducted past reading apparatus, for information recorded on the card to be recovered. A complex and costly motor driven path then returns the card through the slot to the user or otherwise disposes of the card should it not be desired to return the card to the user.

The complexity and cost of card readers has restricted their use to high value installations where either the use of a card reader is unavoidable or the card reader forms only a small part of the overall system cost.

SUMMARY OF THE INVENTION

The present invention seeks to provide an improved card reader requiring no motors of any kind, of extreme economy of construction and requiring no direct supply of electrical power whatsoever. The present invention therefore seeks to provide a card reader of a cost and simplicity rendering it suitable for inclusion in all manner of equipment which, on grounds of cost and complexity, would otherwise not be considered suitable for inclusion of a card reader. Such equipment includes telephones, radio and television equipment, simple door locks, low cost computer terminals, typewriters, word processors, photo-copiers and the like.

According to the present invention, there is provided a card reading apparatus, including a path for supporting and guiding a card and for allowing movement of a card therealong; a transducer operative to detect information recorded on a card as the card is moved along said path; an energy store operative to engage a card and to store elastic energy as the card is inserted into and is moved along said path and further operative, when insertion force urging the card into and along said path is removed, to employ said stored energy to move the card along said path towards expulsion from said path; and a controller operative to control the rate of change of the amount of said stored elastic energy to control the rate of movement of a card along said path.

In a preferred embodiment, a card is introduced between slotted guide arms through a slot into a path wherein a magnetic or optical recording on the card passes beneath a transducer. A slider engages the leading edge of the card and moves along the guide slots compressing a spring as it is moved. A speed controller acts upon the slider to control its rate of movement. The card is pushed by the user through the slot against the elastic opposition of the springs acting upon the slider and when the card is released by the user the spring drives the card back out through the slot. The speed controller acts to control the speed of the card in the path either in a forward direction as the card is inserted, in a backward direction as the card is ejected by the spring, or in both directions. The controller acts to limit the rate of change of velocity of the card to be below a predetermined level so that data recovered by the transducing from the card may be decoded.

The transducer may be optical or magnetic.

The speed controller can comprise a speed regulated gear change or clockwork motor device employing either a flywheel or a speed governor. Alternatively, the controller can comprise a pneumatic piston sliding in a closed housing. In a third alternative, the speed controller may comprise an electric generator rotated by the movement of the slider comprising either a short circuit load, or, where the generator is a D.C. generator, comprising a load including one or more diodes such that dynamo braking is achieved only in one direction of rotation.

As another alternative, the controller can comprise a bellows attached to a shaft connected to the slider, in which case the spring for storing the elastic energy derived from movement of the slider may be included within the bellows housing.

DESCRIPTION OF THE DRAWINGS

The invention is further described, by way of example, by the following description taken in conjunction with the appended drawings in which:

FIGS. 4A to 4C show the sequence of movements involved in the reading of a card.

DESCRIPTION OF THE PREFERRED EMBODIMENTS

Figure 1:
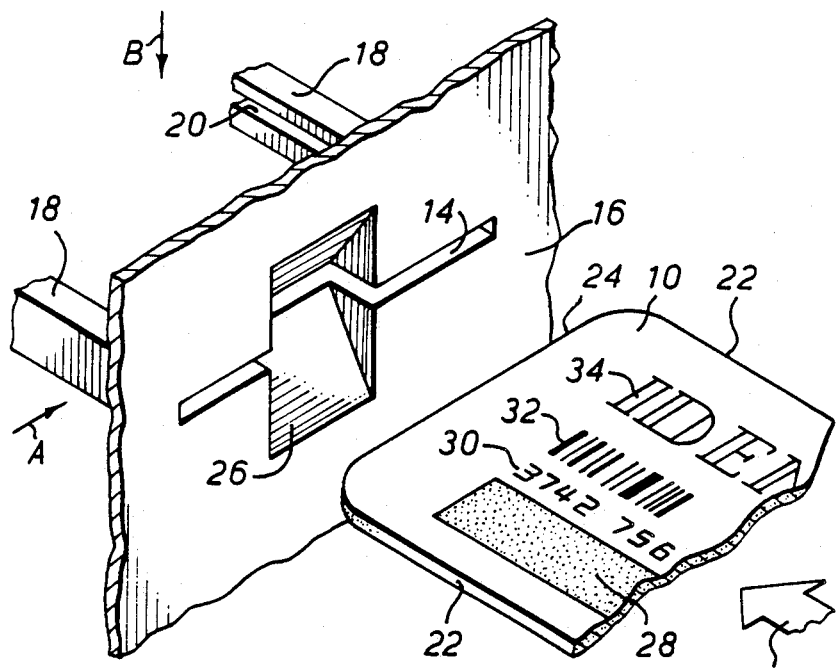
FIG. 1 shows an isometric projected view of the fascia portion of a card reader according to the present invention.

FIG. 1 shows an isometric projected view of the fascia portion of the present invention.

A card 10 is inserted as indicated by a first arrow 12 through a slot 14 in a fascia 16 between guide arms 18 behind the fascia 16. Each guide arm 18 comprises a guide slot 20 (only one of which is visible in FIG. 1 because of the angle of view) operative to guide the card 10 by its sides in a path of movement later to be described. The card 10 comprises a leading edge 24 which, again in a manner later to be described, interacts with a slider in the path defined by the guide slots 20.

The slot 14 comprises a recess 26 set into the fascia 16 permitting a card to be gripped in the slot 14 and also permitting a card 10 to be pushed into the path 20 of the slot 14 with a trailing edge (not shown in FIG. 1) beneath the level of the fascia 16 if so required.

The fascia 16 can form part of the external wall of any kind of equipment, such as a door lock, a telephone or communications device, a computer terminal, and, indeed, any equipment wherein access or use can be controlled by information to be read from a card 10.

The card 10 comprises a magnetic stripe 28 whereon magnetic recorded coded information can be provided. Likewise the card 10 can also comprise optically readable characters 30, bar code characters 32, or characters 34 printed in magnetic ink. All that is required of these characters in the present invention is that they be printed in rows to be read as the card 10 passes beneath an appropriate transducer behind the fascia 16.

Figure 2:
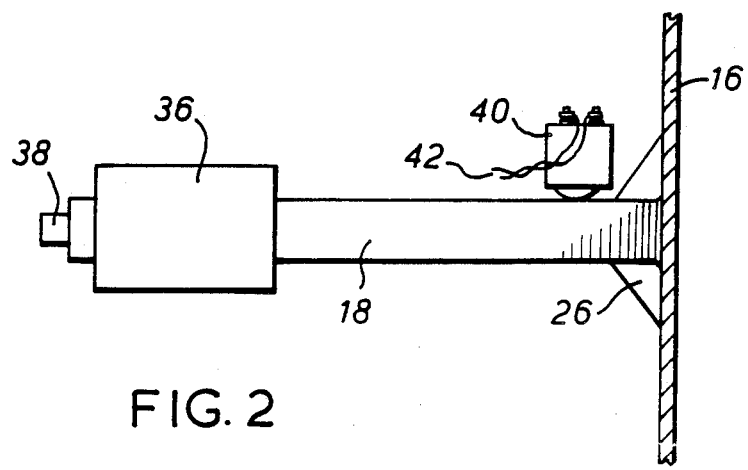
FIG. 2 shows a view of the card reader of FIG. 1, in complete form, looking in the direction of the arrow A.

FIG. 2 shows a side elevation of the apparatus of FIG. 1, in complete form, looking in the direction of the arrow A of FIG. 1.

In addition to those elements shown in FIG. 1, there is also provided a speed controller 36 acting upon a shaft 38 constrained to slide in the guide slots 20 shown in FIG. 1. A magnetic transducer 40 is disposed to read information from the magnetic stripe 28 and a pair of leads 42 convey the analog voltages derived from the magnetic stripe 28 by the transducer 40 for decoding elsewhere.

Figure 3:
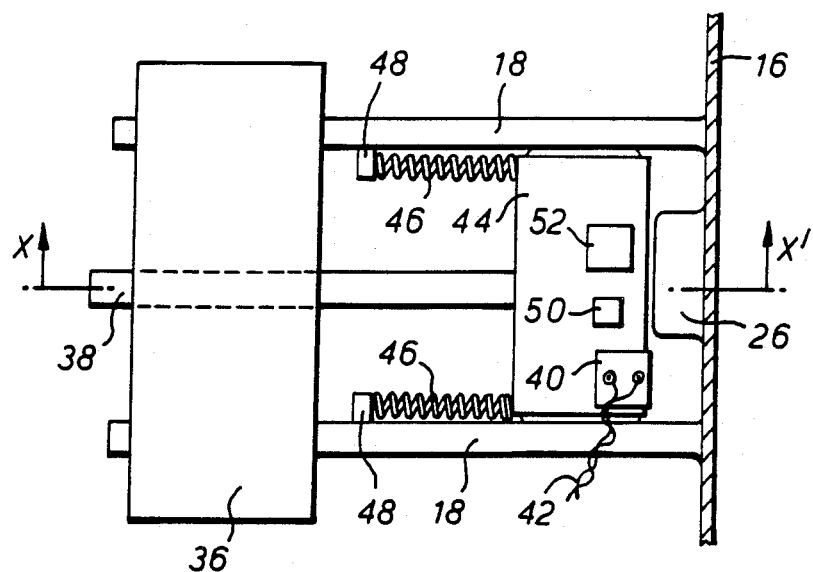
FIG. 3 shows a plan view of the card reader of FIG. 1, in complete form, looking in the direction of the arrow B.

FIG. 3 shows a plan view of the apparatus of FIG. 1, again in complete form looking in the direction of arrow B of FIG. 1.

In addition to those elements shown in FIGS. 1 and 2, FIG. 3 shows a slider 44 constrained to move in the guide slots 20 and urged into abutment with the recess 26 behind the fascia 16 by springs 46 acting against bosses 48 on the guide arms 18. The speed controller 36 can be mounted as shown upon the guide arms 18 or can be mounted in any rigid manner in relation to the fascia 16. Likewise while the bosses 48 are shown attached to the guide arms 18 they too can be anchored in any suitable way in fixed relationship with the fascia 16. While FIG. 3 shows a pair of springs 46, in the present invention only one spring is absolutely required which can be mounted in any manner causing it to oppose movement of the slider 44 away from the innermost portion of the recess 26. The spring or springs 46 may be precompressed to provide at least a predetermined force to act upon the leading edge 24 of the card 10.

The shaft 38 is attached to the slider 44 and passes through or in adjacence with the speed controller 36 for the speed controller 36 to act upon the shaft 38 to control the speed of the slider 44.

A first optical transducer 50 can be employed to read the optically readable characters 30 and a second optical transducer 52 can be provided to read the bar coded characters 32. Any number of different kinds of transducers 40,50,52 can be arrayed proximate to the slot 14 behind the fascia 16 to read data from the card 10 as there are different kinds of data recording 28,30, 32,34 upon the card 10. In the present invention, it is preferred that a magnetic recording 28 is employed allowing the use of a magnetic transducer 40 whereto no external source of power needs to be connected so that the entire apparatus is free of any external power source. Optical transducers 50,52 typically require at least a source of light requiring connection of power to the apparatus.

Figure 4A:
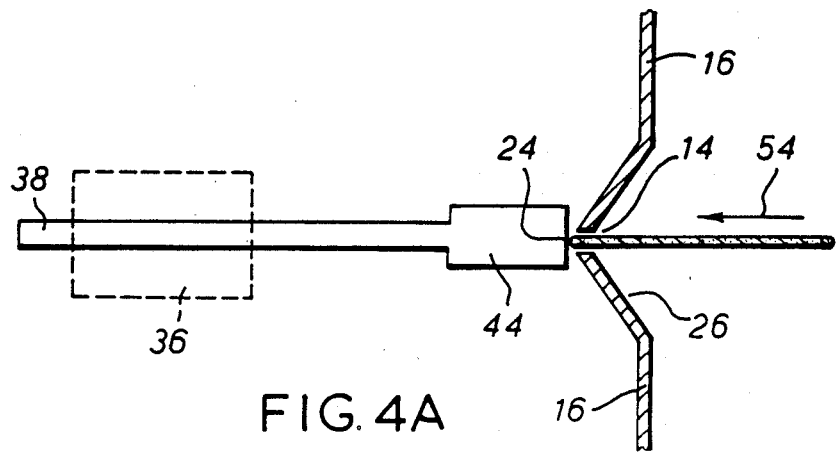

FIG. 4A shows a first stage in the sequence of operations whereby data 28,30,32,34 is read from a card 10. The view shown in FIG. 4A, 4B and 4C is a crosssectional view of FIG. 3 along the line X-X' looking in the direction of the arrows.

The leading edge 24 of the card 10 is urged as indicated by a second arrow 54 against the slider 44 which moves the shaft 38 back into the speed controller 36. The urging of the card 10 is achieved simply by the user pushing the card into the slot 14. The leading edge 24 of the card 10 encounters opposition force from the spring or springs 46 which thereby store elastic energy.

FIG. 4B shows the next subsequent stage of reading of data from a card 10 from that indicated in FIG. 4A.

The card 10 continues to have its leading edge 24 urged against the slider 44 to cause the slider 44 to move and drive the shaft 38 as indicated by a third arrow 56 through the speed controller 36. At an extremity of movement of the card 10 into the path 18,20,14, a digit 58 of the user of the equipment may be inserted into the recess 26 such that a trailing edge 60 of the card 10 may be inserted into the path through the slot 14 substantially beneath the level defined by the fascia 16. The recess 26 is an optional feature of the present invention and it is to be understood that, provided a card 10 is insertable sufficiently for data 30,32,34,28 to be read therefrom without the presence of a recess 26, then the recess 26 can be omitted.

FIG. 4C shows the last stage in the sequence of movements for reading data from a card 10.

The operator's digit 58 is withdrawn from the trailing edge 60 of the card 10 and the spring or springs 46 allowed to push the slider 44 back against the leading edge 24 of the card 10 to urge the card 10 as indicated by a fourth arrow 62 and a fifth arrow 64 back through the slot 14.

Thus the sequence for reading a card 10 consists in the user pushing the card 10 through the slot 14 and then allowing the card 10 to be pushed back out through the slot 14 where the user can retrieve and retain the card 10.

In the present invention, the speed controller 36 acts upon the shaft 38 to regulate the speed and/or acceleration of the slider 44 so that the rate of change of speed of the card 10 in its path 20,14 is never so great as to render the signals 42 from the transducer 40 undecodable while the recorded information 28 passes beneath the transducer 40. Thus, by the time the recorded information 28 is interactive with the transducer 40, the card 10 is moving with a constant velocity or a controlled acceleration allowing standard decoding algorithms to decode the analog signal 42 derived from the transducer 40.

Three forms of controller 36 can be used in the present invention. In a first form the controller 36 acts to control the speed of the slider 44 both when the user inserts the card as shown in FIGS. 4A and 4B and when the card 10 is pushed back out through the path as illustrated in FIG. 4C so that the controller 36 acts bi-directionally allowing the transducer 40 two opportunities to decode the recorded data 28.

In a second form of controller, the controller 36 acts to control the velocity of the slider 44 as the card 10 is inserted into the path 20,14 as illustrated in FIGS. 4A and 4B and allows free and rapid return of the card 10 back through the slot 14 as illustrated in FIG. 4C. In this form of controller 36, the transducer 40 reads the recorded information 28 as the card 10 is inserted into the apparatus and the card 10 is rapidly pushed from the path back to the user. In being rapidly pushed back towards the user, the information 28 recorded on the card 10 is not read by the transducer 40 and data 28 can be read from the card 10 only as the card 10 moves in one of its directions along the path 20,14.

In a third form of controller 36, the controller 36 is operative to control the speed and/or acceleration of the shaft 38 and slider 44 only when the card 10 is being ejected from the path 14,20 as shown in FIG. 4C. When the user is inserting the card 10, the controller 36 does not control the velocity or acceleration of the shaft 38 or the slider 44. The card 10 is thus rapidly inserted into the path 20,14 during which time the transducer 40 is incapable of recovering the recorded data 28 on the card 10 in decodable form. As the card 10 is pushed from the path 14,20 as shown in FIG. 4C the controller 36 controls the acceleration and/or velocity of the shaft 38 to control the speed or acceleration of the slider 44 and the transducer 40 is operative to recover the recorded data 28 in decodable form. Thus, in this third form of controller 36, data is read from the card only on its' return back through the slot 14. The user rapidly inserts the card 10 into the slot 14, releases the card 10, and the card 10 is moved back out through the slot 14 in a slower, controlled fashion.

Figure 5:
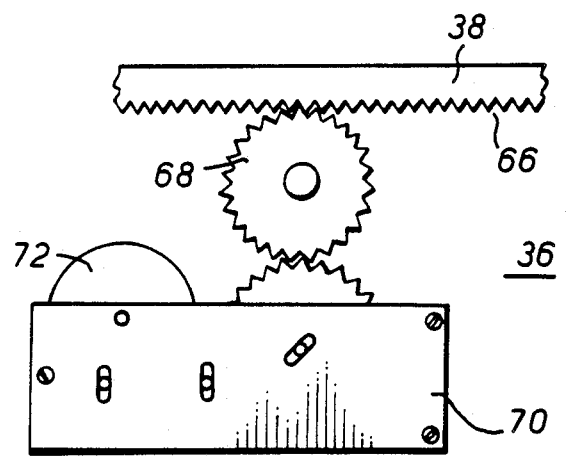
FIG. 5 shows a first preferred embodiment of the speed controller usable in the apparatus illustrated in FIGS. 1 to 4.

FIG. 5 shows a first preferred embodiment of the controller 36 of FIGS. 1 to 4.

The shaft 38 comprising teeth 66 engages a first gear wheel 68 in a speed controlled gear chain 70. As the shaft 38 moves, so the gear chain 70 acts through the first gear wheel 68 to counter movement of the shaft 38 and thereby control the velocity and acceleration of the shaft 38.

The gear chain 70 can comprise a flywheel 72 ensuring that the velocity of the shaft 38 can only slowly be changed in response to the large forces required to change the angular velocity of the flywheel 72. As an addition, or as an alternative, the gear chain 70 may also comprise a speed governing device operative to cause increase in torque in the first gear wheel 68 opposing motion of the shaft 38 if a predetermined angular velocity of the first gear wheel 68 is exceeded.

In the form shown in FIG. 5, the gear chain 70 is operative to act upon the shaft 38 when the card 10 moves in either direction so that the speed of the card 10 is controlled both as it moves into the path 20,14 and out of the path 20,14. The gear chain 70, or the first gear wheel 68, can comprise a ratchet mechanism whereby the speed controlling function is provided only when the shaft 38 moves in one of its two directions so that the card 10 can be controlled either when it enters the path 20,14 or as it is ejected from the path 20,14. Alternatively, the gear teeth 66 on the shaft 38 may be ratchet teeth and the teeth on the first gear wheel 68 may similarly be ratchet teeth designed to cooperate with the shaft 38 such that opposition to the motion of the shaft 38 only occurs in a preferred direction.

The controller 36 shown in FIG. 5 thus serves to control the rate of energy change in the spring or springs 46, either as the card 10 is inserted into the path 20,14, or as the card 10 is ejected from the path 20,14, or both.

Figure 6:
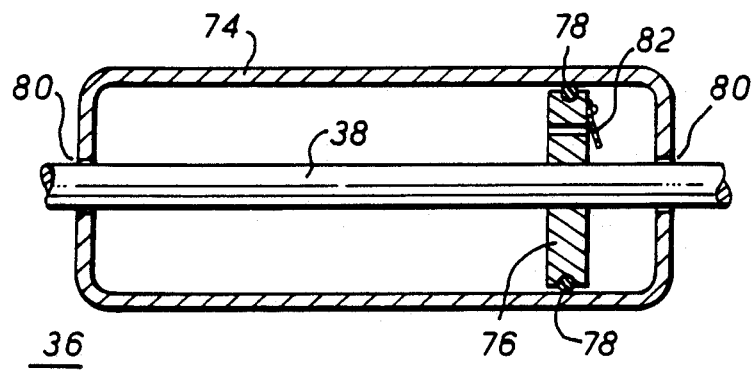
FIG. 6 shows a second preferred speed controller usable in the apparatus illustrated in FIGS. 1 to 4.

FIG. 6 shows a second preferred embodiment of the controller 36 otherwise shown in FIGS. 1 to 4.

The shaft 38 passes through a closed housing 74 wherein the shaft 38 moves a piston 76 pneumatically sealed 78 within the housing 74. As the shaft 38 moves to and fro in the housing 74 so the piston 76 compresses air in the housing 74 which can either be forced out through the gap left between the shaft 38 and the openings 80 whereby the shaft 38 enters the housing 74 or can be forced out through other purpose made vents or perforations in the housing 74. A valve 82 can be provided in the piston 76 allowing the piston 76 to compress air for controlled expulsion and resistance to movement only when the shaft 38 moves in one of its directions. Thus, if the valve 82 is mounted on a first side of the piston 76, the velocity of the shaft 38 and thereby of the slider 44 is controlled as the shaft 38 moves with insertion of the card 10 into the path 14,20; if the valve 82 is mounted on the other side of the piston 76, the velocity of the shaft 38 is controlled when the card 10 moves in the opposite direction; and if the valve 82 is omitted altogether and the piston 76 has no opening passing therethrough, the velocity of the shaft 38 is controlled when the card 10 is moved in both of its possible directions.

Figure 7A:
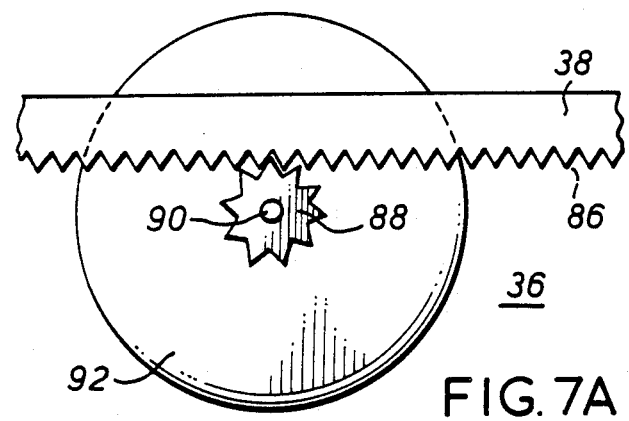
FIGS. 7A to 7C show a third preferred controller usable in the apparatus illustrated in FIGS. 1 to 4.

FIG. 7A shows a third preferred embodiment of the controller 36 otherwise shown in FIGS. 1 to 4.

The shaft 38 is once again provided with teeth 86 which engage a cog wheel 88 operative to turn an armature shaft 90 of an electrical generator 92. A gear box or other velocity transforming device can be incorporated between the shaft 38 and the armature shaft 90 to provide the required rate of rotation of the armature shaft 90 for the function hereinafter described.

In the simplest form of such a controller, the output terminals of the electrical generator 92 are simply shorted together to provide a dynamo brake resisting movement of the shaft 38 in either direction. Alternatively, a predetermined known resistive load can be placed across the terminals of the electrical generator 92.

Figures 7B, 7C:
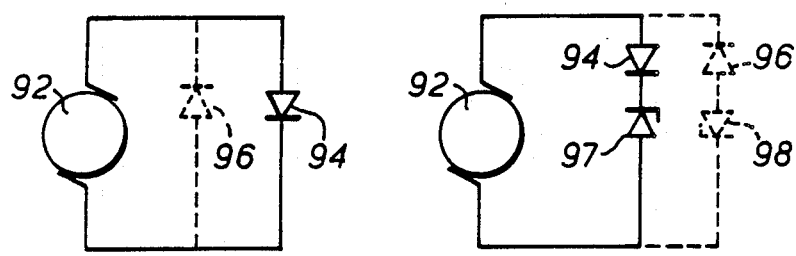

FIG. 7B shows a circuit diagram for a unidirectional speed controller for the electrical generator 92. A first diode 94 is connected across the terminals of the electrical generator 92 such that a near short circuit load is applied across the generator 92 when the shaft 38 moves in a first direction in which case the voltage of the generator 92, now a D.C. generator, causes the first diode 94 to conduct but, when the shaft 38 moves in the opposite direction, the very high impedance of the first diode 94 allows the shaft 38 to move unopposed by dynamo braking.

The circuit shown in FIG. 7B may be used as a precise speed control if the angular velocity of the generator armature shaft 90 at which the desired velocity of the card 10 along the path 14,20 is reached is chosen to cause the electrical generator 92 to produce the required conduction voltage of the first diode 94. The angular velocity of the armature shaft 90 and thus the linear velocity of the shaft 38 increase until the first diode 94 begins to conduct. The acceleration of the shaft 38 and of the armature shaft 90 is thereafter opposed by a force which increases with increasing current conduction of the first diode 94 and thus serves as a means for selecting and controlling the velocity of the card 10 along the path 20,14.

If bi-directional velocity control is required, then a second diode 96 (shown in FIG. 7B in dotted line) can be added conducting in the opposite direction to the first diode 94 allowing speed control of the shaft 38 when the card 10 moves in either direction.

FIG. 7C shows a second kind of uni-directional load which can be connected across the generator 92 to control its linear velocity. Here a first zener diode 97 is added in series with the first diode 94 to increase the voltage whereat the series combination of the first diode 94 and the first zener diode 97 conduct, thereby allowing a wider range of selection of controlled velocity for the shaft 38. Once again the first diode 94 ensures that conduction only takes place when the shaft 38 is moving in one direction and when the shaft is moving in the opposite direction, the high impedence offered by the first diode 94 ensures that shaft 38 may move freely.

Once again, if bi-directional control of speed is required then, as shown in dotted line on FIG. 7c, the second diode 96 may be coupled in series with a second zener diode 98 for selecting the controlled velocity of the shaft 38 when moving in the opposite direction. The stand-off voltages of the first 97 and second 98 zener diode can be chosen to be different from one another to allow the card 10 to have a controlled velocity which is different in each direction of movement so that the transducer 40 may read the recorded information 28 at two different speeds.

Figure 8:
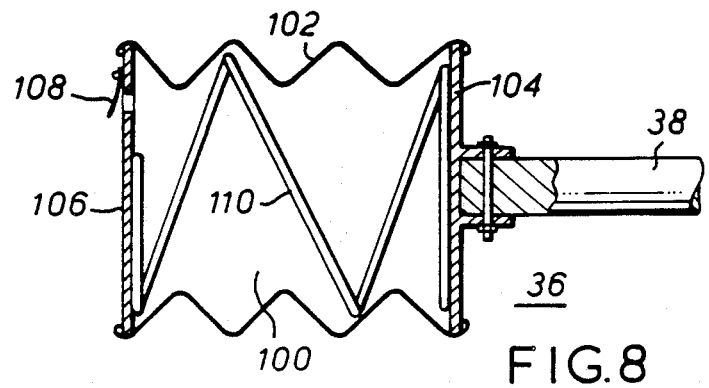
FIG. 8 shows a fourth preferred embodiment of a controller usable in the apparatus illustrated in FIGS. 1 to 4.

FIG. 8 shows a fourth preferred embodiment of the controller 36 otherwise shown in FIGS. 1 to 4.

A bellows 100 comprising a skin 102, a frontplate 104, and a backplate 106, is attached by its frontplate 104 to the free end of the shaft 38 and the backplate 106 is fixed in rigid relationship to the fascia 16.

A valve 108 is provided in backplate 106 of the bellows 100 and can be adapted to cause the bellows 100 to resist movement of the shaft 38 in either direction depending upon which side of the backplate 106 the valve 108 is mounted and in which direction it acts. If the valve 108 is omitted altogether, then the bellows 100 resist movement of the shaft 38 in both directions. The bellows 100 acts either to resist expulsion of air through its skin 102 or to resist intake of air through its skin 102 and, so that this resistance may be controlled, the skin, the backplate 106 and the frontplate 104 may be made permeable to air by means of provision of vents of controlled dimensions or by selection of the fabric of the bellows skin 102 to be of controlled air permeability.

In the embodiment shown on FIG. 8, the spring or springs 46 shown in FIG. 2 can conveniently be provided as a bellows spring 110 within the bellows 100 itself.

Whilst the elastic stored energy in the present invention has been shown stored in a spring, it is to be understood that other devices may be used to store the energy derived from insertion of the card 10 into the path 14,20. Alternative devices include compressible gas devices, gravity displacement devices and hydraulic devices. Any device may be used in place of the springs 46,110 capable of turning the movement of the card 10 into stored potential energy (hereinafter defined as elastic energy) to be delivered up once more to the card 10 as the card 10 is ejected from the path 20,14.

The slider 44 has hereinbefore been described as moving in the guide slots 20. It is to be appreciated that the slider may be replaced by any device capable of acting upon the leading edge 24 of the card 10 to oppose entry of the leading edge 24 of the card 10 to store the elastic, potential energy and to be controlled in its velocity by the controller 36. In particular, the controller 36 may act directly upon the slider or its substitute without provision of intermediate shaft 38. For example, the gear teeth 66,86 may be provided directly beneath the slider 44. The pneumatic devices shown in FIGS. 6 and 8 may be caused to act directly upon the slider 44.

The present invention also encompasses any or all of the features and embodiments hereinbefore described taken individually or in any combination.

I claim:

1. A card reading apparatus comprising:
    guide means for guiding movement of a card along a path;
    transducer means for detecting information recorded on said card as said card is moved along said path;
    energy store means for elastically storing energy as said card is inserted into said guide means and moved along said path by an insertion force, said energy store means further for moving said card along said path towards expulsion from said guide means in response to removal of said insertion force; and
    controller means for controlling the rate of movement of said card along said path;
    said controller means comprising a D.C. electrical generator operative to produce across its output terminals and electromotive force proportional in sense and magnitude to the direction and velocity respectively of said card;
    said generator having an electrical load including at least one unidirectional current conducting device connected across said output terminals, said unidirectional current conducting device being driven to a conducting state when the produced electromotive force reaches a predetermined magnitude.

2. An apparatus as defined in claim 1 wherein said electrical load comprises a first diode, said first diode being poled to conduct when said card achieves sufficient velocity in a preferred direction to overcome the turn-on voltage of said first diode.

3. An apparatus as defined in claim 2 further including a first zener diode connected in series with said first diode, said first zener diode being wired to oppose conduction in said first diode, and said first zener diode having a regulation voltage selected to effect a desired velocity of said card in said preferred direction.

4. An apparatus as defined in claim 2 wherein said electrical load comprises a second diode, said second diode being poled to conduct when said card achieves sufficient velocity in a second direction, opposite to said preferred direction, to overcome the turn-on voltage of said second diode.

5. An apparatus as defined in claim 4 further including a second zener diode in series with said second diode, said second zener diode being wired to oppose conduction in said second diode, and said second zener diode having a regulation voltage selected to effect a desired velocity of said card in said second direction.

6. An apparatus as defined in claim 3 wherein said electrical load includes a second diode, said second diode being poled to conduct when said card achieves sufficient velocity in a second direction, opposite to said preferred direction, to overcome the turn-on voltage of said second diode.

7. An apparatus as defined in claim 6 further including a second zener diode in series with said second diode, said second zener diode being wired to oppose conduction in said second diode, and said second zener diode having a regulation voltage selected to effect a desired velocity of said card in said second direction.

8. An apparatus as defined in claim 1 wherein said guide means includes a slider for engaging a leading edge of said card, said controller means being coupled to said slider, whereby the rate of movement of said slider along said path is controlled.

9. An apparatus as defined in claim 8 wherein said guide means includes guide slots for engaging and guiding the edges of said card, and wherein said slider is supported and guided by said guide slots.

10. An apparatus as defined in claim 9 wherein said controller means includes a controller and a shaft, said shaft coupling together said controller and said slider.

11. An apparatus as defined in claim 10 wherein said shaft is coupled to rotate an armature in said electrical generator.

12. An apparatus as defined in claim 11 further including an axle having a pair of opposite extremities, one of said extremities of said axle being coupled to said armature, a cog wheel affixed to the other extremity of said axle, said shaft having a linear progression of teeth formed thereon, said teeth engaging said cog wheel such that linear motion of said shaft in response to the movement of said card effects rotational movement of said axle and said armature.

13. An apparatus as defined in claim 1 wherein said energy stored means includes a spring mounted to be compressed as said card is inserted and moved along said path by said insertion force.

14. An apparatus as defined in claim 13 wherein said energy store means includes a spring coupled between said slider and said guide means.

15. An apparatus as defined in claim 14 wherein said guide means includes an entry slot permissive of introduction of said card therethrough, said entry slot being positioned adjacent to said guide means.

16. An apparatus as defined in claim 15 wherein said entry slot is provided in a fascia, said slot comprising a recess in said fascia adapted to permit insertion of said card into said entry slot with a trailing edge of said card beneath the surface of said fascia.

* * * * *